United States Patent Office 2,984,884
Patented May 23, 1961

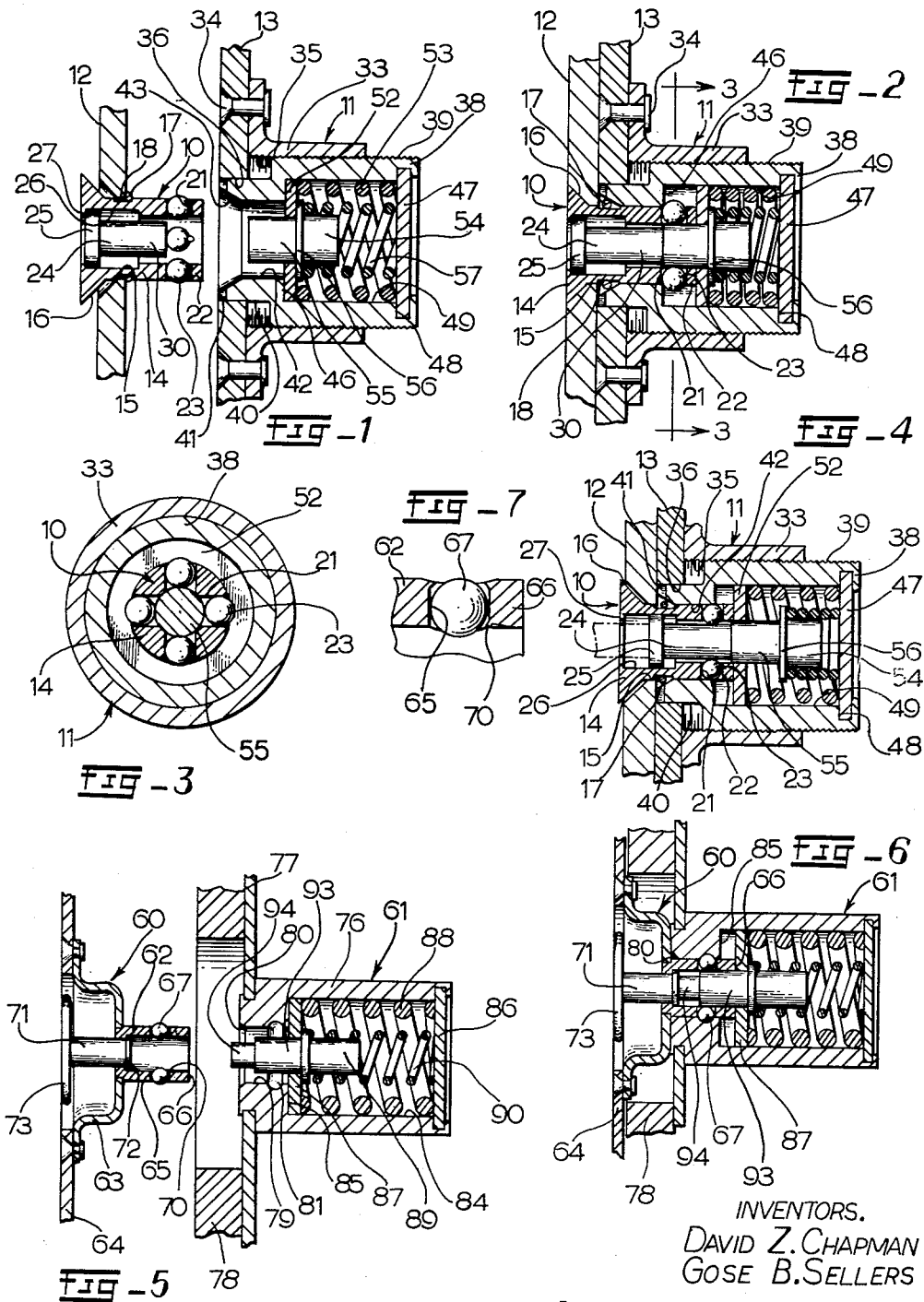

2,984,884

STRESSED PANEL FASTENER

David Z. Chapman and Gose B. Sellers, Los Angeles, Calif., assignors, by mesne assignments, to Aerpat A.G., Glarus, Switzerland, a corporation of Switzerland Filed June 9, 1958, Ser. No. 740,815

10 Claims. (Cl. 24—211)

This invention relates to fasteners of the rapid engagement, quick release type and, in particular, to a fastener especially adapted for joining stressed panels to a frame in aircraft structures and the like.

It is an object of the invention to provide a fastener which can be engaged by merely pressing the panel or other object carrying a portion of the fastener, into the desired position. A further object of the invention is to provide such a fastener which may be released by pressing on the fastener itself, with the fastener having a self-disengaging or pop-up mechanism which separates the two units of the fastener. Another object is to provide a fastener, a portion of which can be loosely carried in a panel and which is engaged by pressing such portion into another portion with the thumb or a suitable tool.

It is an object of the invention to provide a fastener which, in conjunction with a plurality of similar fasteners, will maintain stressed panels in position on a frame with the fasteners maintaining the panel rigid and secure under load.

It is an object of the invention to provide a fastener which is separable into two units for attachment respectively to two elements which are to be fastened together. Another object is to provide such a fastener in which one unit includes a barrel, a detent carried adjacent one end of the barrel and movable inwardly and outwardly between inner, retracted and outer, extended positions, with the detent projecting laterally from the barrel when in the extended position, and a plunger for sliding movement in the barrel. Another object is to provide such a fastener in which the other unit receives the first unit and includes a housing having a passage for slidingly receiving the barrel and an internal shoulder facing away from the end which receives the barrel, an apertured retainer carried in the housing for movement coaxial with the barrel, ejector spring means engaging the housing and the retainer and urging the retainer toward the shoulder of the housing, a plunger for movement in the housing and projecting through the retainer with a section of the plunger engaging the detent when the barrel is positioned in the housing for moving the detent outwardly into its extended position into engagement with the shoulder and locking the barrel in the housing, and locking spring means engaging the housing and the plunger therein urging the plunger toward the barrel. A further object of the invention is to provide such a fastener in which the two units are joined by pressing the barrel into the housing and in which the two units are separated by depressing the plunger carried in the barrel, with the spring means ejecting the barrel from the housing.

It is another object of the invention to provide such a fastener in which the barrel includes one or more radial holes therethrough adjacent one end thereof with a detent, such as a spherical ball, positioned in each of the radial holes and movable inwardly and outwardly between retracted and extended positions with the plunger of the housing sliding in the barrel to move the balls to the extended position for engaging the shoulder of the housing and locking the two units together.

The invention also comprises novel details of construction and novel combinations and arrangements of parts, together with other objects, advantages, features, and results, which will more fully appear in the course of the following description. The drawing merely shows and the description merely describes preferred embodiments of the present invention which are given by way of illustration or example.

In the drawing:

Fig. 1 is a sectional view of a preferred embodiment of the invention with the fastener disengaged;

Fig. 2 is a sectional view showing the fastener of Fig. 1 in the engaged position;

Fig. 3 is an enlarged sectional view taken along the line 3—3 of Fig. 2;

Fig. 4 is a sectional view similar to that of Fig. 2 showing the fastener partially disengaged;

Fig. 5 is a sectional view of an alternative embodiment of the invention with the fastener disengaged;

Fig. 6 is a sectional view showing the fastener of Fig. 5 in the engaged position; and Fig. 7 is an enlarged view of a portion of Fig. 5 showing a detent and passage.

Referring now to the embodiment of Figs. 1 through 4, the fastener of the invention comprises two units 10, 11, with the unit 10 carried in a member 12, which may be a panel or the like, and the unit 11 carried in a member 13 to which the member 12 is to be fastened.

The unit 10 includes a barrel 14 carried in an opening 15 in the member 12, the barrel having a conical head 16 mating with a tapered section of the opening 15 so as to be flush with the outer or left surface of the member 12. A retainer ring 17 is positioned in an external annular groove 18 in the barrel 14 for retaining the barrel in the opening.

Four radial passages 21 are provided in the wall of the barrel 14 adjacent end 22, with a ball detent 23 positioned in each of the passages 21 for movement inwardly and outwardly between inner, retracted positions, shown in Fig. 1, and outer, extended positions, shown in Fig. 2. The detents 23 prevent withdrawal of the unit 10 from the unit 11 when the units are joined with the detents in their extended positions. The barrel is peened or staked adjacent the inner and outer ends of the passages 21, as shown in Fig. 7, to prevent loss of the detents from the passages.

A plunger 24 is carried in the barrel 14 for movement along the axis of the barrel, the plunger serving to release the fastener in a manner to be described hereinbelow. It is not necessary that the plunger be retained in the barrel; however, this construction is preferred as the plunger is always available for use and also serves as a plug keeping the interior of the barrel clean. The plunger 24 has an enlarged head 25 which slides in a counterbore 26 in the head end of the barrel 14, the barrel being rolled or peened over at 27 to retain the plunger therein. The other end 30 of the plunger 24 is dimensioned so that it can move past the detents 23 without moving the latter from their inner, retracted positions.

The unit 11 includes an anchor shell 33 which is mounted on the member 13 by suitable means such as rivets 34, the shell 33 having a threaded opening 35 which is aligned with an opening 36 in the member 13. A housing 38 with an externally threaded portion 39 and a reduced cylindrical portion 40 is carried in the shell 33, the housing being rotatable by means of a screwdriver slot 41 in the portion 40 for adjusting the position of the housing relative to the member 13. A passage 42 in the housing 38 slidingly receives the barrel 14 of the unit 10 when the detents 23 are in their retracted positions, the passage being provided with an outward flare 43 for guiding the barrel.

The housing 38 has an internal shoulder 46 facing away from the portion 40, and a cap 47 set in a counterbore 48 with the end of the housing spun over to hold the cap in place, the housing, shoulder and cap defining a spring chamber 49.

A retainer 52 in the form of an apertured disc is positioned in the chamber for sliding movement along the axis of the housing, with a compression coil spring 53 positioned between the retainer 52 and cap 47 and urging the retainer toward the shoulder 46.

A plunger 54 is positioned in the chamber 49, the plunger having an end 55 projecting through the apertured retainer 52 into the passage 42, and a shoulder 56 for engagement with the retainer 52 to limit movement of the plunger relative to the retainer. A compression coil spring 57 is positioned in the chamber 49 inside the spring 53 and around the plunger 54, the spring engaging the cap 47 and the shoulder 56 of the plunger 54 urging the plunger into engagement with the retainer. The end 55 of the plunger 54 is a sliding fit in the barrel 14 and engages and moves the detents 23 to their extended positions when the end 55 is positioned opposite the passages 21.

The fastener is closed or engaged by bringing the members 12 and 13 together with the barrel 14 positioned in the passage 42. When the barrel is depressed, the inwardly retracted detents 23 engage the end of the portion 55 of the plunger 54, compressing the spring 57 and moving the plunger 54 to the right as viewed in the drawing. As the barrel is depressed further, it engages the retainer 52, compressing the spring 53 and moving the retainer away from the shoulder 46. When the barrel is inserted to the position shown in Fig. 2, the detents will be moved outwardly to their extended positions by the portion 55 of the plunger 54 as it slides into the barrel. The fastener is now in the locked position as shown in Fig. 2 with the detents engaging the shoulder, preventing withdrawal of the barrel from the housing, the detents being held in their extended positions by the plunger of the housing.

The fastener is unlocked or released by moving the portion 55 of the plunger 54 out of the barrel 14. This is accomplished by moving the plunger 24 to the right as shown in Fig. 4, the plunger 24 engaging the plunger 54 and compressing the spring 57. As soon as the portion 55 of the plunger 54 moves out of engagement with the detents 23, the detents will be moved from their extended to their retracted position, the barrel will be ejected from the housing by the spring 53, and the fastener will return to the condition of Fig. 1.

Thus, it is seen that the fastener of the invention provides for flush mounting of a panel on a frame with the fastener requiring a push for engaging and a push for disengaging. Also, this flush mounting fastener has high shear strength, an important feature for panel mountings. The panel fastener of Figs. 1–4 may be engaged by pressing on the head 16 of the barrel 14 with the thumb and may be disengaged by pressing on the head 25 of the plunger 24 with any pointed tool small enough to enter the central opening in head 25, see the tool in broken lines in Figure 4.

An alternative form of the fastener of the invention is shown in Figs. 5 and 6, including units 60, 61, corresponding to the units 10, 11, respectively, of the embodiment of Figs. 1 through 4. The unit 60 includes a barrel 62 which is fixed in an anchor bracket 63 which in turn is adapted for mounting on a member 64. Aligned, radial passages 65 are provided in the wall of the barrel adjacent end 66, with a ball detent 67 positioned in each of the passages for movement inwardly and outwardly between inner, retracted positions and outer, extended positions. The barrel 62 is peened or staked adjacent the ends of the passages to prevent loss of the detents. Preferably this is accomplished at the inner ends of the passages by forming an inwardly projecting annular ridge 70 from the material of the inner surface of the end 66.

A plunger 71 is carried in the barrel 62 for sliding movement along the axis of the barrel, the plunger having an enlarged section at one end 72 and a thumb button 73 at the other end which retain the plunger in the barrel. The unit 61 comprises a housing 76 fixed to a plate 77 which in turn is adapted for mounting to a member 78, which member is to be joined to the member 64. A passage 79 in the housing 76 slidingly receives the barrel 62, a flared portion 80 of the passage serving to guide the barrel into the passage. An internal annular groove 81 in the passage 79 receives the detents when the two units of the fastener are locked together, as in Fig. 6. The forward edge of groove 81 constitutes a shoulder which functions for the same purpose as shoulder 46 in Figures 1 and 2.

The housing 76 includes a chamber 84 between a shoulder 85 and a cap 86, a retainer 87, a spring 88, a plunger 89, and a spring 90, each of which functions in the same manner as the corresponding part in the embodiment of Figs. 1 through 4.

In the embodiment of Figs. 5 and 6, the plunger 89 in the housing includes a first section 93 projecting into the passage 79 which first section is a sliding fit in the barrel 62 and moves the detents to their extended positions when positioned in the barrel, as seen in Fig. 6. The plunger 89 also has a second section 94 projecting from the first section 93, which second section is of lesser diameter, permitting the detents to be in their inner, retracted positions while the second section is positioned opposite the passages 65 in the barrel. The second section 94 of the plunger 89 serves the same function as the end 30 of the plunger 24 in the embodiment of Figs. 1 through 4.

When the units 60, 61 have been engaged in the same manner as the units 10, 11 described above, the fastener will be engaged as seen in Fig. 6. To disengage the fastener, it is necessary to move the plunger 89 to the right so that the detents may move to their inner positions. This is accomplished by pressing the button 73 to effect engagement of the plunger 71 with the plunger 89 to position the section 94 opposite the detent passages. The mode of operation and the advantages achieved in the fastener of Figs. 5 and 6 are the same as those of the fastener of Figs. 1 through 4. The panel fastener of Figs. 5 and 6 may be engaged by pressing on the member 64 with the hand and may be disengaged by pressing on the button 73 with the thumb or a tool.

Although exemplary embodiments of the invention have been disclosed and discussed, it will be understood that other applications of the invention are possible and that the embodiments disclosed may be subject to various changes, modifications and substitutions without necessarily departing from the spirit of the invention.

We claim as our invention:

1. In a fastener, the combination of: a barrel; a detent carried adjacent one end of said barrel and movable inwardly and outwardly between inner retracted and outer extended positions, said detent projecting laterally from said barrel when in said extended position; a first plunger mounted for sliding movement in said barrel; a housing having a passage at one end for slidingly receiving said barrel and having an internal shoulder facing away from said one end; an apertured retainer carried in said housing for movement into engagement with the end of said barrel when in said passage; ejector spring means engaging said housing and said retainer and urging said retainer in a first direction away from the other end of said housing toward said shoulder and moving said barrel in a direction to eject it from said passage; a second plunger carried in said housing for movement relative to said retainer and coaxial with said passage, said second plunger projecting through said retainer and including means limiting movement of said second plunger relative to said retainer in said first direction, said second plunger including a section for extending into said passage and barrel and engaging said detent for moving said detent outwardly into its extended position into engagement with said shoulder for locking said barrel in said housing; and locking spring means engaging said housing and said second plunger and urging said second plunger in said first direction, said first plunger being engageable with said second plunger for moving the latter in a second direction opposite to said first direction against the urging of said locking spring means, permitting inward movement of said detent and ejection of said barrel from said housing by the action of said ejector spring.

2. In a fastener, the combination of: a barrel; a detent carried adjacent one end of said barrel and movable inwardly and outwardly between inner retracted and outer extended positions, said detent projecting laterally from said barrel when in said extended position; a first plunger slidingly carried in said barrel; a housing having a passage at one end for slidingly receiving said barrel and having an internal shoulder facing away from said one end; an apertured retainer carried in said housing for movement into engagement with the end of said barrel when in said passage; ejector spring means engaging said housing and said retainer and urging said retainer in a first direction away from the other end of said housing toward said shoulder and moving said barrel in a direction to eject it from said passage; a second plunger journalled in said retainer for movement relative to said retainer and coaxial with said passage and including means limiting movement of said second plunger relative to said retainer in said first direction, said second plunger including a section for extending into said passage and engaging said detent for moving said detent outwardly into its extended position into engagement with said shoulder for locking said barrel in said housing; and locking spring means engaging said housing and said second plunger and urging said second plunger in said first direction, said first plunger being engageable with said second plunger for moving the latter in a second direction opposite to said first direction against the urging of said locking spring means, permitting inward movement of said detent and ejection of said barrel from said housing by the action of said ejector spring.

3. In a fastener, the combination of: a barrel; a detent carried adjacent one end of said barrel and movable inwardly and outwardly between inner retracted and outer extended positions, said detent projecting laterally from said barrel when in said extended position; a first plunger slidingly carried in said barrel; a housing having a passage at one end for slidingly receiving said barrel and having an internal shoulder facing away from said one end; an apertured retainer carried in said housing for movement into engagement with the end of said barrel when in said passage; a first compression coil spring positioned in said housing between the other end thereof and said retainer and urging said retainer in a first direction away from said other end towards said shoulder and moving said barrel in a direction to eject it from said passage; a second plunger journalled in said retainer for movement relative to said retainer and coaxial with said passage and including means limiting movement of said second plunger relative to said retainer in said first direction, said second plunger including a section for extending into said passage and engaging said detent for moving said detent outwardly into its extended position into engagement with said shoulder for locking said barrel in said housing; and a second compression coil spring positioned concentric with said first spring in said housing between the other end thereof and said second plunger and urging said second plunger in said first direction, said first plunger being engageable with said second plunger for moving the latter in a second direction opposite to said first direction against the urging of said second spring, permitting inward movement of said detent and ejection of said barrel from said housing by the action of said ejector spring.

4. In a fastener for joining two members, the combination of: a barrel adapted to be carried by one of said members for limited sliding movement, with one end of said barrel projecting from said member and the other end accessible for applying axial forces thereto; a detent carried adjacent one end of said barrel and movable inwardly and outwardly between inner retracted and outer extended positions, said detent projecting laterally from said barrel when in said extended position; a first plunger slidingly carried in said barrel; a housing adapted to be carried by the other of said members and having a passage at one end for slidingly receiving said barrel and having an internal shoulder facing away from said one end; an apertured retainer carried in said housing for movement into engagement with the end of said barrel when in said passage; ejector spring means engaging said housing and said retainer and urging said retainer in a first direction away from the other end of said housing toward said shoulder and moving said barrel in a direction to eject it from said passage; a second plunger journalled in said retainer for movement relative to said retainer and coaxial with said passage and including means limiting movement of said plunger relative to said retainer in said first direction, said plunger including a section for extending into said passage and engaging said detent for moving said detent outwardly into its extended position into engagement with said shoulder for locking said barrel in said housing; and locking spring means engaging said housing and said second plunger and urging said second plunger in said first direction, said first plunger being engageable with said second plunger for moving the latter in a second direction opposite to said first direction against the urging of said locking spring means, permitting inward movement of said detent and ejection of said barrel from said housing by the action of said ejector spring.

5. In a fastener for joining two members, the combination of: a barrel adapted to be carried by one of said members with one end of said barrel projecting from said member; a detent carried adjacent said one end of said barrel and movable inwardly and outwardly between inner retracted and outer extended positions, said detent projecting laterally from said barrel when in said extended position; a first plunger slidingly carried in said barrel; a housing having a threaded exterior section and adapted to be threadedly mounted upon the other of said members for axial movement relative to said other member, said housing having a passage at one end for slidingly receiving said barrel and having an internal shoulder facing away from said one end; an apertured retainer carried in said housing for movement into engagement with the end of said barrel when in said passage; ejector spring means engaging said housing and said retainer and urging said retainer in a first direction away from the other end of said housing toward said shoulder and moving said barrel in a direction to eject it from said passage; a second plunger journalled in said retainer for movement relative to said retainer and coaxial with said passage and including means limiting movement of said second plunger relative to said retainer in said first direction, said second plunger including a section for extending into said passage and engaging said detent for moving said detent outwardly into its extended position into engagement with said shoulder for locking said barrel in said housing; and locking spring means engaging said housing and said second plunger and urging said second plunger in said first direction, said first plunger being engageable with said second plunger for moving the latter in a second direction opposite to said first direction against the urging of said locking spring means, permiting inward movement of said detent and ejection of said barrel from said housing by the action of said ejector spring.

6. In a fastener for joining two members, the combination of: a barrel adapted to be carried by one of said members with one end of said barrel projecting from said member; a detent carried adjacent said one end of said barrel and movable inwardly and outwardly between inner retracted and outer extended positions, said detent projecting laterally from said barrel when in said extended position; a first plunger slidingly carried in said barrel; a housing adapted to be carried by the other of said members, said housing having a passage at one end for slidingly receiving said barrel and having an internal shoulder facing away from said one end; an apertured retainer carried in said housing for movement into engagement with the end of said barrel when in said passage; ejector spring means engaging said housing and said retainer and urging said retainer in a first direction away from the other end of said housing toward said shoulder and moving said barrel in a direction to eject it from said passage; a second plunger journalled in said retainer for movement relative to said retainer and coaxial with said passage and including means limiting movement of said second plunger relative to said retainer in said first direction, said second plunger including a section for extending into said passage and engaging said detent for moving said detent outwardly into its extended position into engagement with said shoulder for locking said barrel in said housing; and locking spring means engaging said housing and said second plunger and urging said second plunger in said first direction, said first plunger being engageable with said second plunger for moving the latter in a second direction opposite to said first direction against the urging of said locking spring means, permitting inward movement of said detent and ejection of said barrel from said housing by the action of said ejector spring.

7. In a fastener, the combination of: a barrel; a detent carried adjacent said one end of said barrel and movable inwardly and outwardly between inner retracted and outer extended positions, said detent projecting laterally from said barrel when in said extended position; a first plunger for sliding movement in said barrel; a housing having a passage at one end for slidingly receiving said barrel and having an internal shoulder facing away from said one end; an apertured retainer plate carried in said housing for movement into engagement with the end of said barrel when in said passage; a first compression coil spring positioned in said housing between the other end thereof and said retainer plate and urging said retainer plate in a first direction into engagement with said shoulder and moving said barrel in a direction to eject it from said passage; a second plunger journalled in said retainer plate for movement relative to said retainer and coaxial with said passage and including means limiting movement of said second plunger relative to said retainer plate in said first direction, said second plunger including a section for extending into said passage and engaging said detent for moving said detent outwardly into its extended position into engagement with said shoulder for locking said barrel in said housing; and a second compression coil spring positioned concentric with said first coil spring in said housing between said other end thereof and said second plunger and urging said second plunger in said first direction, said first plunger being engageable with said second plunger for moving the latter in a second direction opposite to said first direction against the urging of said second spring.

8. In a fastener, the combination of: a barrel; a detent carried adjacent one end of said barrel and movable inwardly and outwardly between inner retracted and outer extended positions, said detent projecting laterally from said barrel when in said extended position; a first plunger for sliding movement in said barrel; a housing having a passage at one end for slidingly receiving said barrel and having an internal shoulder facing away from said one end and an internal annular groove in said passage between said one end and said shoulder; an apertured retainer carried in said housing for movement into engagement with the end of said barrel when in said passage; a first compression coil spring positioned in said housing between the other end thereof and said retainer and urging said retainer in a first direction into engagement with said shoulder and moving said barrel in a direction to eject it from said passage; a second plunger journalled in said retainer for movement relative to said retainer and coaxial with said passage and including means limiting movement of said second plunger relative to said retainer in said first direction, said second plunger including a section for extending into said passage and engaging said detent for moving said detent outwardly into its extended position into engagement with said groove for locking said barrel in said housing; and a second compression coil spring positioned concentric with said first coil spring in said housing between the other end thereof and said second plunger and urging said second plunger in said first direction, said first plunger being engageable with said second plunger for moving the latter in a second direction opposite to said first direction against the urging of said second coil spring.

9. In a fastener, the combination of: a housing having a spring chamber and a passage communicating with said chamber, said passage including an internal shoulder facing toward said chamber; an apertured retainer slidingly positioned in said chamber for movement along the axis of said passage; a retainer compression coil spring carried in said chamber engaging said housing and retainer and urging the latter towards said shoulder; a locking plunger having first and second sections, with said first section slidingly carried in said aperture of said retainer for projecting into said passage, and said second section positioned in said chamber, said locking plunger including stop means limiting the movement thereof through said retainer into said passage; a plunger compression coil spring positioned within said retainer spring and around said second section of said locking plunger engaging said housing and locking plunger and urging the latter toward said retainer; a barrel having an end for sliding movement in said passage and engagement with said retainer; a detent carried adjacent said end of said barrel and movable inwardly and outwardly between inner retracted and outer extended positions, said detent projecting laterally from said barrel when in said extended position, with said first section of said locking plunger having means for engaging said detent when said barrel is positioned in said passage for moving said detent outwardly into its extended position into engagement with said shoulder for locking said barrel in said housing; said barrel when locked in said passage having an end portion extending into said spring chamber and holding said retainer away from said shoulder against the action of said retainer compression spring, and a release plunger slidingly carried in said barrel for engaging said locking plunger when said barrel is locked in said housing.

10. In a fastener, the combination of a housing having a spring chamber having a stop at one end and a passage communicating with said chamber, said passage including an internal shoulder facing towards said chamber, an abutment member arranged within said chamber for movement along the axis of said passage and into contact with said stop adjacent said passage, a compression spring located within said chamber and acting upon said abutment normally to hold said abutment member against said stop, a barrel having an end for sliding movement into said passage and into engagement with said abutment member for moving said abutment member away from said stop against the compression of said spring, a radially movable detent carried by said barrel near the end thereof and being movable laterally out of said barrel to engage said shoulder to lock said barrel within said passage in a position with said abutment member held away from said stop, a detent-actuating member yieldably carried by said abutment member and extending into the end of said barrel and holding said detent in its locking position, and a detent-releasing member slidably mounted within said barrel and extending from said detent-actuating member to the other end of said barrel.

References Cited in the file of this patent

UNITED STATES PATENTS

| | | |
|---|---|---|
| 1,522,139 | Pilcher et al. | Jan. 6, 1925 |
| 1,777,349 | Cantone | Oct. 7, 1930 |
| 1,798,796 | Johnson | Mar. 31, 1931 |
| 2,472,651 | Diaper | June 7, 1949 |
| 2,480,662 | McKinzie | Aug. 30, 1949 |
| 2,562,459 | Hoey | July 31, 1951 |
| 2,758,625 | Poupitch | Aug. 14, 1956 |
| 2,817,135 | Harris et al. | Dec. 24, 1957 |

FOREIGN PATENTS

| | | |
|---|---|---|
| 36,853 | France | May 6, 1930 |
| 618,812 | France | Dec. 21, 1926 |
| 897,080 | France | May 15, 1944 |